United States Patent [19]

Eiermann

[11] Patent Number: 4,793,778
[45] Date of Patent: Dec. 27, 1988

[54] ECCENTRIC SHAFT OF A ROTARY PISTON INTERNAL COMBUSTION ENGINE

[75] Inventor: Dankwart Eiermann, Weissensberg, Fed. Rep. of Germany

[73] Assignee: Wankel GmbH, Berlin, Fed. Rep. of Germany

[21] Appl. No.: 876,197

[22] Filed: Jun. 19, 1986

[30] Foreign Application Priority Data

Dec. 23, 1985 [DE] Fed. Rep. of Germany ....... 3545820

[51] Int. Cl.$^4$ .................... F01C 1/22; F01C 21/06; F16C 3/16; B23P 17/00
[52] U.S. Cl. ..................................... 418/60; 418/94; 418/61.2; 74/606 A; 29/421.1
[58] Field of Search ................. 418/60, 61 A, 94; 74/570, 606 A, 567; 123/242; 417/405; 29/156.4 R, 421 R; 72/58, 61

[56] References Cited

U.S. PATENT DOCUMENTS

| 2,892,254 | 6/1959 | Garvin | 72/61 |
| 3,042,009 | 7/1962 | Froede et al. | 418/61 A |
| 3,240,423 | 3/1966 | Jones | 418/60 |
| 3,845,667 | 11/1974 | Honrath et al. | 74/567 |

FOREIGN PATENT DOCUMENTS

| 2110940 | 10/1971 | Fed. Rep. of Germany | 418/94 |
| 57-206530 | 12/1982 | Japan | 72/61 |
| 58-132325 | 8/1983 | Japan | 29/421 R |
| 324687 | 2/1930 | United Kingdom | 418/94 |
| 1441697 | 7/1976 | United Kingdom | 418/60 |

Primary Examiner—John J. Vrablik
Attorney, Agent, or Firm—Becker & Becker, Inc.

[57] ABSTRACT

A rotary piston internal combustion engine of trochoidal type of construction having a housing that consists of dual-curvature mantle runway and side parts, such housing having an eccentric shaft passing therethrough as well as having a triangular piston upon an eccentric of the eccentric shaft, such triangular piston having sealing parts rotating in continuous sliding engagement along a mantle runway in a planetary movement wherein the eccentric shaft is made hollow. The eccentric shaft is produced in a hydraulic pressure procedure. The eccentric shaft is lengthened and extended at an open end thereof via a pipe or tube pressed in the open end and coaxial therewith so as to extend beyond the shaft bearing or receiving of circulating pumps as well as output gears for additional auxiliary devices employable therewith. An end of the eccentric shaft extending beyond the shaft bearing has openings for inlet and discharge of fluid or liquid cooling medium.

5 Claims, 3 Drawing Sheets

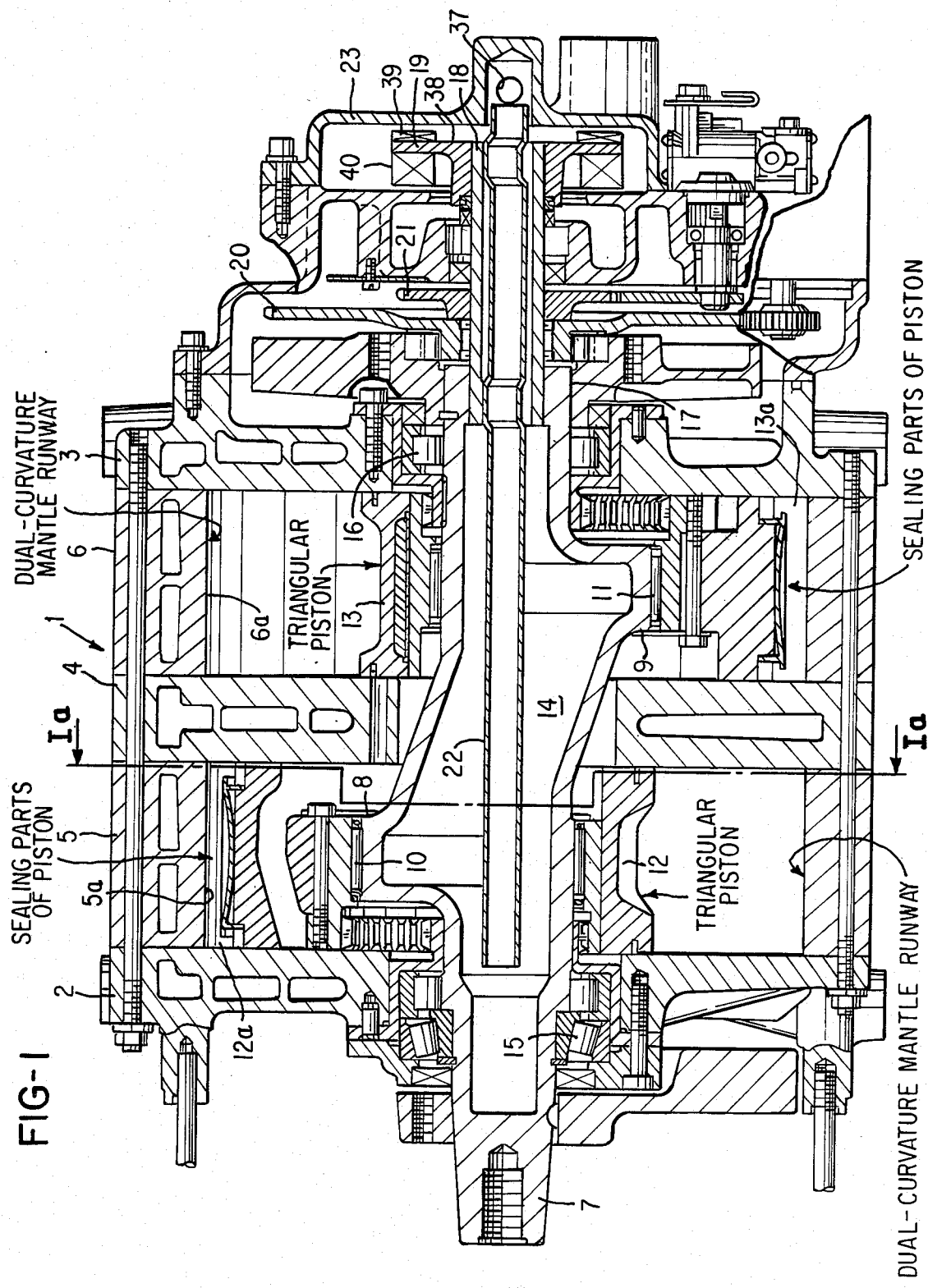

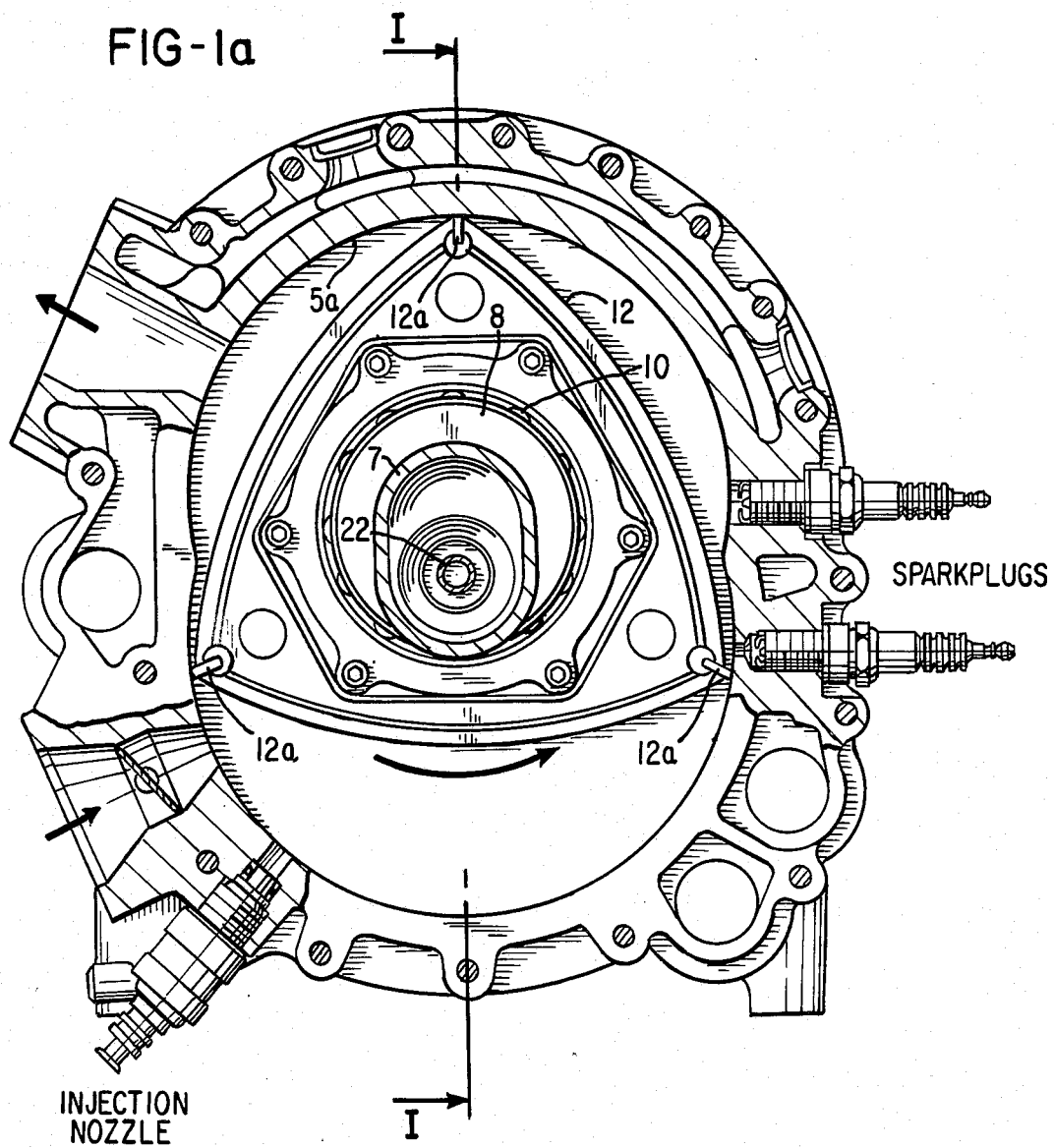

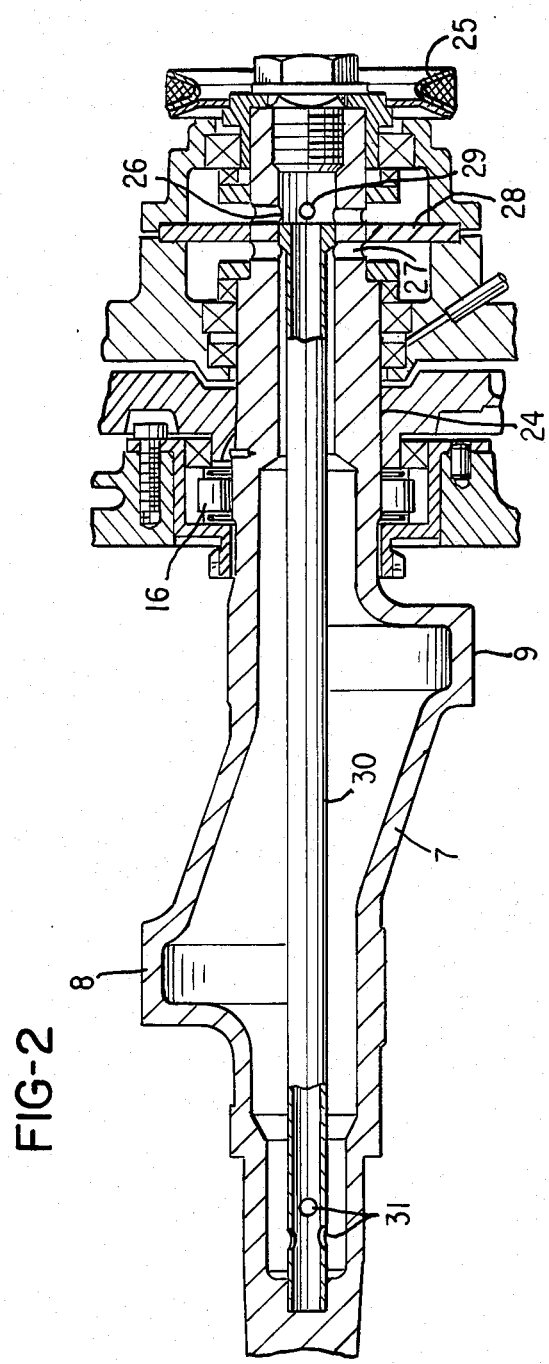

ECCENTRIC SHAFT OF A ROTARY PISTON INTERNAL COMBUSTION ENGINE

BACKGROUND OF THE INVENTION

1. Field of the Invention

The present invention relates to an eccentric shaft of a rotary piston internal combustion engine of trochoidal type of construction with a housing consisting of a dual-curvature mantle runway and side parts; the housing has an eccentric shaft passing therethrough; a triangular piston upon an eccentric of the eccentric shaft rotates in continuous sliding engagement with the sealing parts thereof against the mantle runway in a planetary movement. The invention concerns especially a multi-disk rotary piston internal combustion engine of the same type of construction.

2. Description of the Prior Art

Such internal combustion engines have an advantage over previous or conventional aircraft engines such that with equal output or performance considerably smaller or more novel proportions or scale prevails, especially in an axial plan view and most of all a considerably smaller or more nominal weight. This makes such internal combustion engines especially adapted and suitable for aircraft engines. The greatest weight proportion of such a rotary piston internal combustion engine is represented by the eccentric shaft, which weight is so much more effective and consequential respectively the more compact such an engine is arranged or constructed and in relation to the proportion or scale thereof being more efficient and stronger in the output or performance thereof.

An object of the present invention accordingly is to fulfill and provide features or measures to reduce the weight of such eccentric shafts accompanied by maintenance of the complete bending- and torsional-strength or stability thereof.

SUMMARY OF THE INVENTION

The production or manufacture of a hollow shaft can occur in a known hydraulic pressing method or procedure with which the pre-formed or pre-shaped axially drilled or bored-through shaft is expanded or widened in a mold or die from the axial bore or drilling thereof subject to a high hydraulic pressure to a desired or rated value thereof. Via the deformation occurring and encountered at the same time there results a higher material strength and torsional stiffness or rigidity, so that a shaft results with very good material characteristics and features, which simultaneously only provides or has approximately one-eighth of the weight of a solid shaft of equal proportions or measurement. Most of all there results an advantage compared with previous or conventionally forged shafts, with which, primarily and most of all in sections of the largest material strength or thickness, as for the eccentrics, never a continuous uniform and good strength characteristic can be attained. The so obtained raw part or piece of the shaft requires only little machining or turning-off of the bearing surfaces as accomplished by machining operations so that in mass production there arises and is encountered a considerable cost reduction compared with the production or manufacture of conventional shafts. The shafts are extraordinarily inexpensive with mass production aside from the soon amortized costs for an external or outer tool, mold or die.

This object, and other objects and advantages of the present invention, will appear more clearly from the following specification in conjunction with the exemplary embodiments illustrated in the drawings.

BRIEF DESCRIPTION OF THE DRAWINGS

FIG. 1 is a cross-sectional view taken along line I—I in FIG. 1a and showing an axial section through a fluid-cooled rotary piston internal combustion engine having a shaft in accordance with the present invention;

FIG. 1a is a cross-sectional view taken along line Ia—Ia in FIG. 1; and

FIG. 2 is a view that illustrates a further embodiment of such a shaft having features in accordance with the present invention.

DESCRIPTION OF PREFERRED EMBODIMENTS

Referring now to the drawings in detail, exemplified embodiments are shown that are respectively shafts for dual-disk or two-plate machines or engines, with detailed description thereof being provided in the following paragraphs referring to the drawings in the case.

The internal combustion engine illustrated in FIG. 1 is an aircraft motor having two disks or plates. A housing 1 thereof has two side plates or disks 2 and 3 and a middle part 4, between which the mantle parts 5 and 6 are arranged. The eccentric shaft 7 passing through the housing 1 is constructed and made hollow with pistons 12 and 13 rotating upon eccentrics 8 and 9 respectively of the eccentric shaft having roller bearings 10 and 11 therewith. The inner space or chamber 14 of the eccentric shaft 7 in the inner walls thereof follows the outer contour or shape of the shaft, especially in the eccentrics 8 and 9 thereof. This has the advantage that via inclusion of this inner space or chamber 14 in the fluid cooling system of the housing 1, that the eccentric bearings 10 and 11 are cooled directly. This is true also for the shaft bearings 15 and 16 in the housing parts 2 and 3.

A pipe or tube 18 is pressed into an open right end 17 of the eccentric shaft 7 so as to extend or lengthen the eccentric shaft 7 beyond the shaft bearing 16. This pipe or tube 18 can serve for driving or propulsion of auxiliary or additional devices including for example a circulating pump 19, lighting generator or dynamo and the like. With that the circulating pump 19 (FIG. 1) is pressed directly upon the pipe or tube 18, while the drive or propulsion of the remaining auxiliary or additional devices occurs via the gears 20 and 21. This arrangement has an advantage that a further saving in weight results, since the eccentric shaft 7 can be kept shorter and is extended or lengthened only with the light pipe or tube 18, which is adequate for drive or propulsion of the auxiliary devices. The supply of the cooling fluid occurs via a supply tube 22 which turns or rotates along with the eccentric shaft 7 or can be fastened stationary or fixedly in a housing cover 23. The cooling fluid or liquid is supplied via a bore in the housing cover 23 according to which a by-pass of the housing cooling medium circulation is branched-off therefrom. The return flow of the cooling water occurs in an annular or ring-shaped intermediate space or chamber between the supply pipe or tube 22 and the tube 18. Thus, the cooling fluid can be described as entering port 37, flowing through tube 22, exiting the tube and flowing between the exterior of the tube and the interior of the hollow shaft and eccentric means and exiting at the circulating pump 19. The circulating pump 19 is a device which includes a wheel or impeller 38 with small blades 39 on a right side thereof and large blades 40 on a left side thereof. The large blades 40 convey the cooling medium circulation of the motor relative to which the hot return flow from the inner space or chamber 14 of the eccentric shaft is supplied with the small blades or vanes 39.

As shown in FIG. 2, the hollow eccentric shaft 7 also can be lengthened or extended beyond the shaft bearing 16. A V-belt drive pulley 25 is wedged upon a shaft end 24 projecting beyond the bearing 16 and this V-belt drive pulley 25 takes over the drive or propulsion of the auxiliary or additional devices. The cooling fluid or liquid enters an inner space or chamber of the shaft 7 via inlet opening 26 and discharges via outlet opening 27. The inlet and outlet flow is separated via the separating disk or plate 28. The supply of the cooling fluid or liquid occurs from inlet opening 26 via bores 29 in an end of supply pipe or tube 30 to one side of the separating plate 28 and via the tube 30 to outlet openings 31 through inner hollow space between the outside of the tube 30 and within walls of the hollow eccentric shaft to the outlet opening 27 provided for cooling fluid discharge at opposite ends respectively of the supply pipe or tube 30 as apparent in FIG. 2. The return of the cooling fluid or medium occurs via an annular space or chamber between an inner wall of the eccentric shaft 7 and the supply tube 30.

The inlet opening 26 is provided for the cooling fluid or medium which then enters into the supply tube at the opening 29, while the openings 27 lead back into the cooling medium circulation from the annular space between the supply tube and the inner wall of the shaft. This means that cold cooling medium or coolant is in the space before the opening 26 and hot cooling medium or coolant is conveyed via the opening 27.

There is apparent from the foregoing that the eccentric shaft 7 is made hollow. Furthermore the eccentric shaft 7 is produced in a hydraulic pressure procedure or method. The eccentric shaft 7 at an open end 25 thereof is lengthened or extended via a pipe or tube 18 coaxial therewith and pressed therein to extend beyond the shaft bearing 16 for receiving circulation pumps or output gears for additional devices. The cooling fluid or medium for cooling the eccentric bearings 10 and 11 and the bearings 15 and 16 of the eccentric shaft 7 enters via a bypass of the cooling medium circulation of the motor at an end of the eccentric shaft 7 opposite the power take-off side or output end via a supply pipe or tube 22, 30 into an inner space or chamber 14 and is returned into the cooling medium circulation of the motor via an annular space or chamber between the inner wall of the eccentric shaft 7 and the supply pipe of tube 22, 30.

When referring to a mold or die used in the production of the shafts, there is meant an outer form or mold which completely encloses and surrounds the shaft and which negatively has the form or shape of the finished shaft, corresponding to a drop-force die. The procedure is summarized in the following statements.

A straight shaft without any eccentric and with a cylindrical outer surface is drilled or bored through axially to form a passage or space into which the aforementioned outer tool, mold or die is inserted and via the bore of the shaft being subjected very suddenly to a very high hydraulic pressure. The shaft is then pressed into the outer tool or mold in a manner similar to that in which glass bottles are blown in a mold. Consequently, a very high-grade material compensation results. The shaft and eccentric thereof fully join, fit or engage as to the outer tool or mold, so that finish cutting is needed only a nominal extent. This procedure has not been applicable previously for shafts of such machines of the type involved with the present inventive disclosure. Thus the features of the present invention apply basically for the construction of such motors, since the weight of the heaviest part, which moreover is eccentric, is reduced to an eight of original weight previously known for such a part.

Thus, the eccentric shaft and eccentrics thereof are constructed hollow whereby the walls of the inner space of the eccentric shaft follow the outer contour of the shaft and its eccentrics. Recognition of this distinction is necessary because not only the shaft is bored-out hollow, but rather most of all the eccentrics are hollowed-out so far as possible, in order that the eccentric bearings, upon which the rotary pistons rotate, are cooled adequately. With that, interior cooling of the pistons can be eliminated and this represents a considerable advantage, since such interior cooling requires a comparatively great cost and complexity and most of all such interior cooling needs a large space.

The present invention is, of course, in no way restricted to the specific disclosure of the specification and drawings, but also encompasses any modifications within the scope of the appended claims.

What I claim is:

1. For a rotary piston internal combustion engine of trochoidal type of construction with a housing consisting of a dual-curvature mantle runway and side parts with the housing as well as having an eccentric shaft passing therethrough and a triangular piston operable in a planetary movement upon an eccentric means of the eccentric shaft such that sealing parts of the triangular piston rotate in continuous sliding engagement along a mantle runway, the improvement therewith comprising that the eccentric shaft and the eccentric means thereof are constructed entirely hollow as subjected to a hydraulic pressure via deformation for higher material strength as well as torsional stiffness and rigidity so that walls of inner space of said eccentric shaft follow outer contour of said shaft and eccentric means thereof in a space relation to each other as constructed entirely hollow which simultaneously provides approximately one-eight of the weight compared with a solid shaft of equal proportions and measurement; and bearings cooled directly as located radially adjacent to said eccentric means of said shaft constructed entirely hollow and subjected to effects of fluid cooling medium that flows through the hollow shaft as well as eccentric means thereof, a tube being pressed into an open end of the eccentric shaft and being coaxial therewith such that said tube lengthens and extends said eccentric shaft beyond a shaft bearing therewith, said tube being arranged to receive circulating pumps as well as output gears for additional auxiliary devices employable therewith.

2. A rotary piston internal combustion engine according to claim 1, wherein an end of said eccentric shaft extending beyond a shaft bearing has openings for supply and discharge of fluid coolind medium therewith.

3. A rotary piston internal combustion engine according to claim 1, wherein said inner hollow space of said shaft has fluid cooling medium flow relative thereto via a coaxial tube and an annular chamber around said tube.

4. A rotary piston internal combustion engine according to claim 1, wherein said hollow shaft and said also hollow eccentric means include corners and bends subjected to a continuous fluid cooling medium flow relative thereto as well as having very high deformation of walls and a high material strength and torsion stiffness in the walls that form said hollow shaft and said also hollow eccentric means.

5. In a process of making an eccentric hollow shaft and eccentric means thereof for a rotary piston internal combustion engine of trochoidal type of construction with a housing consisting of a dual-curvature mantle runway and side parts with the housing having an eccentric hollow shaft passing therethrough and a triangular piston upon an also hollow eccentric means of the eccentric hollow shaft such that sealing parts of the triangular piston in a planetary movement rotate in continuous sliding engagement respectively along a mantle runway, the improvement therewith comprising the steps of making the eccentric hollow shaft and also hollow eccentric means thereof including;

forming the eccentric shaft and eccentric means constructed entirely hollow so that walls of inner hollow space of said eccentric shaft follow outer contour of said shaft and also hollow eccentric means thereof in a spaced relation to each other simultaneously to provide approximately one-eight of the weight compared with a solid shaft of equal proportions and measurements as well as to permit fluid cooling medium to be supplied and discharged through the hollow shaft and also hollow eccentric means as to bearings cooled directly radially outwardly from the shaft and eccentrics; pressing a tube into an open end of the eccentric shaft and locating the tube coaxial therewith such that said tube lengthens and extends said eccentric shaft beyond the bearings therewith; and supplying and discharging fluid cooling medium as to the eccentric hollow shaft via said tube arranged to receive circulating pumps by pressing thereof onto said tube as well as journaling output gears on the eccentric hollow shaft for driving additional auxiliary devices employable therewith.

* * * * *